April 18, 1967 L. NEWSOME ETAL 3,315,044
MULTI-CHANNEL TIME AND SEQUENCE ELECTRICAL CONTROL APPARATUS
Filed Oct. 1, 1963 5 Sheets-Sheet 1
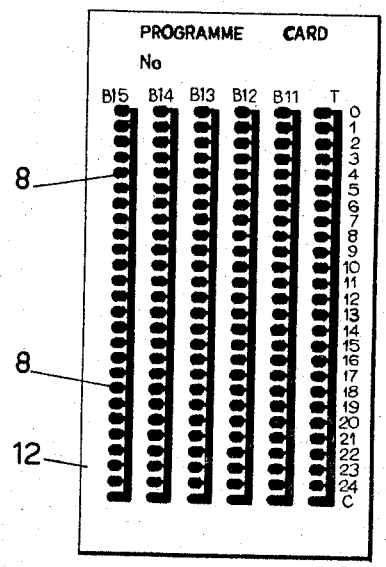
—FIG. 3.—
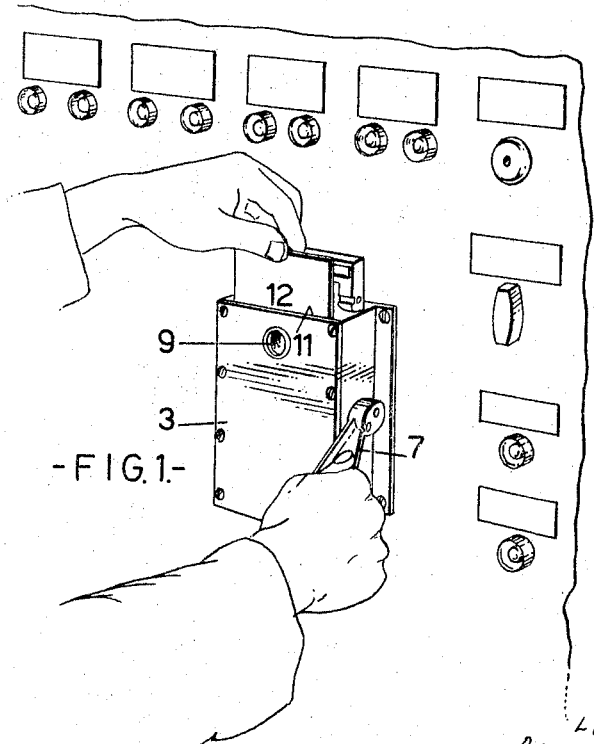
—FIG. 1.—
INVENTORS
Leslie Newsome
Margaret Harral Fisher
BY
Michael J. Striker

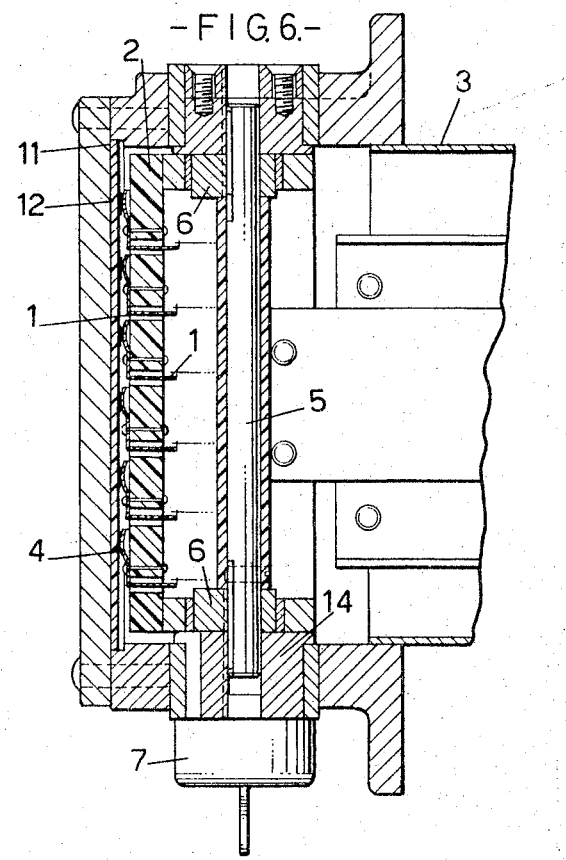
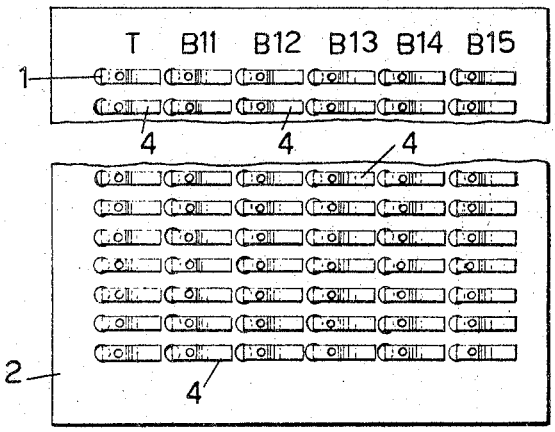

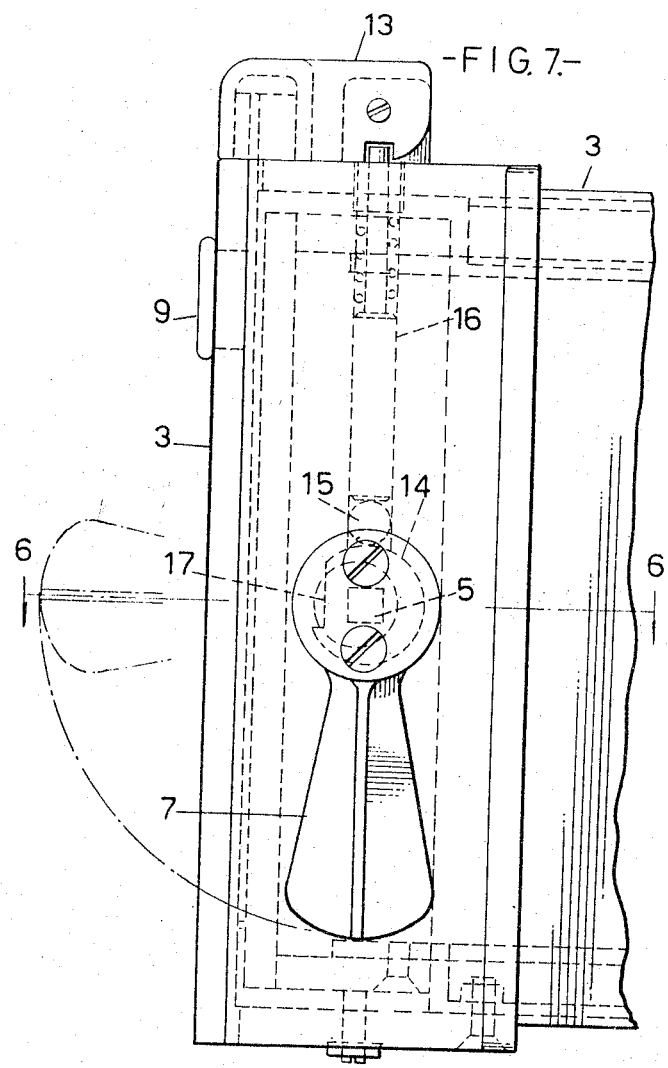

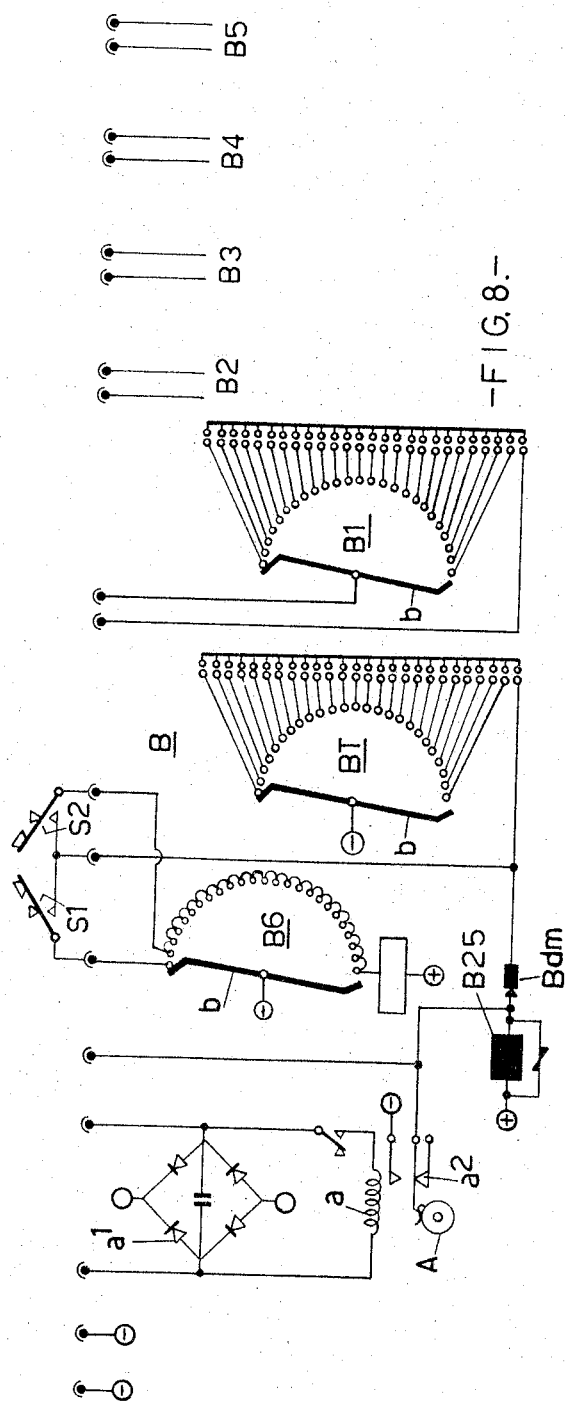

United States Patent Office 3,315,044
Patented Apr. 18, 1967

3,315,044
MULTI-CHANNEL TIME AND SEQUENCE
ELECTRICAL CONTROL APPARATUS
Leslie Newsome, Wheatley, and Margaret H. Fisher, Mytholmroyd, England, assignors to Process Units (Halifax) Limited, Halifax, England, a corporation of Great Britain
Filed Oct. 1, 1963, Ser. No. 312,921
Claims priority, application Great Britain, Oct. 5, 1962, 37,704/62
6 Claims. (Cl. 200—46)

This invention relates to improvements in multi-channel time and sequence electrical control apparatus employing a stepping switch or uni-selector.

In the specification of U.S. Patent No. 2,995,671 dated Aug. 8, 1961, an electro-magnetically stepped uni-selector and its operation is described together with mechanism for controlling the operation of a laundry and textile washing, dyeing, bleaching or similar machine comprising an electro-magnetically stepped uni-selector, a pair of contact banks of which, in conjunction with a set of switches, control the timing of successive stages of an operating cycle and further contact banks of which are connected through pre-selector switches and relays to control the operating conditions of each stage.

The object of the present invention is the employment of a uni-selector for maintaining a program without any possibility of interference from an outside source while it is in operation. A further object is to provide a program of control by means of a card which is itself a switching arrangement, forming part of a total electrical circuit. Furthermore, the card is held firmly in place and does not move during the whole operation of the cycle.

According to the invention the multi-channel time and sequence control apparatus comprises a multi-banked electro-magnetically stepped uni-selector mounted in a casing, one bank operating as a time control for a sequence of operations which are initiated and controlled by a further bank or banks of the uni-selector, a panel mounted in the casing to which the leads from the banks are connected and a program card clamped to the panel to provide the required program of time and sequence operation.

The invention will be described with reference to the accompanying drawings:

FIG. 1 is a perspective view of the front of a casing in which a uni-selector is housed mounted on a panel and showing a program card being clamped in the casing.

FIG. 3 is a plan view of a program card 12.

FIG. 4 is a plan view of part of a contact panel 2 for the leads from segment of the uni-selector (the contacts from six banks being shown).

FIG. 6 is a section on line 6—6 of FIG. 7.

FIG. 7 is an enlarged side elevation of part of FIG. 5.

FIG. 8 is a diagrammatic circuit diagram of three banks of the uni-selector.

Figure 2:
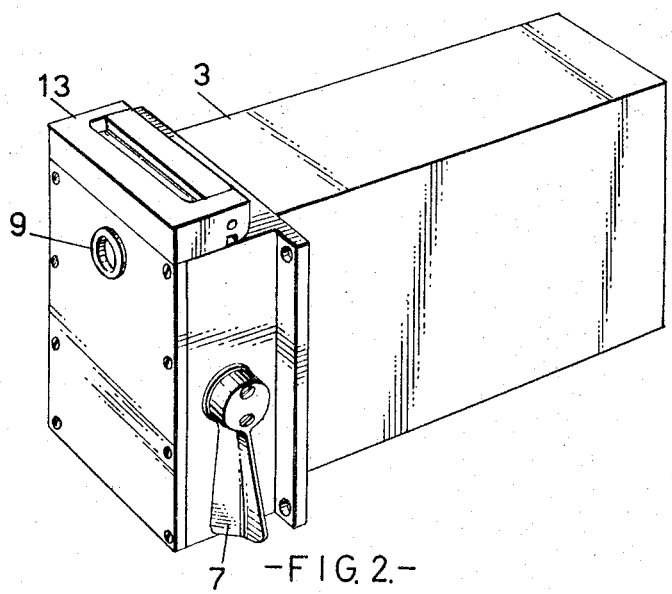
FIG. 2 is a perspective view of the casing of the uni-selector shown in FIG. 1.
Figure 5:
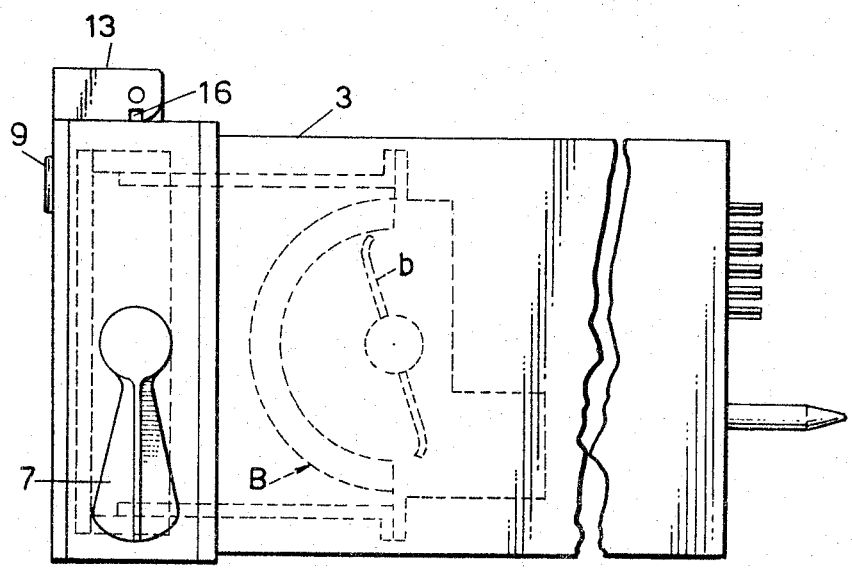
FIG. 5 is a side elevation partly broken away of the casing.

An electro-magnetic stepped uni-selector is formed with a plurality of banks $B^T$, $B^1$, $B^2$, $B^3$, $B^4$, $B^5$ etc., each bank being formed of 25 contacts arranged in a semi-circle and adapted to be engaged in turn by rotary wipers $b$.

A suitable timing unit producing the pulse to the uni-selector coil $B^{25}$ is as follows:

The coil $a$ of a synchronous motor is supplied from an A.C. supply and drives a cam A which actuates a micro switch $a^2$ which provides a directional current to the coil $B^{25}$ the A.C. supply being obtained from bridge rectifiers $a^1$. The cam A may be duplicated to provide pulses at multiples of the synchronous speed of the motor.

A stepping coil $B^{25}$ is operated during a program to actuate the uni-selector from a timer unit giving a suitable D.C. supply of such duration as to allow the coil $B^{25}$ to operate an electro-magnet so that on release the wiper $b$ is allowed to step one position. The coil $B^{25}$ is also operated through its own self-interruption contacts B$dm$ from one bank BT, the circuit being closed through a start switch S1 or a re-set stop switch S2. One bank B6 has no connection with the program card 12 and serves only for stopping, re-setting and starting of the control.

A D.C. directional current is passed through the wiper B6 and through the first contact on the bank B6 to the start switch S1. When this is operated the current is then passed throgh contacts B$dm$ to the coil B25 which energizes B$dm$ contacts and interrupts the supply and the wiper $b$ on the bank B6 steps on to the second contact. The second, third etc., contacts through to the twenty-fifth contact are connected electrically so that the current contact number 2 is now connected to the switch $s^2$ and when this is operated the current is then extended through contacts B$dm$ to energize the coil B25. Contacts B$dm$ interrupt the supply of current and allow the wiper $b$ to step on to the third contact which is still in connection with switch $s^2$. This operation repeats itself through to the twenty-fifth contact and back to the first where it will rest until switch $s^1$ is operated.

The wipers $b$ for the banks $B^T$, $B^1$, $B^2$, $B^3$ etc. step in unison with the wiper $b$ for the bank $B^6$. Each of the 25 contacts on each bank of the uni-selector is connected to terminals 1 arranged in columns T, B11, B12, B13, B14, B15 etc. on a contact panel 2 mounted with the uni-selector in a casing 3. The panel 2 is mounted in a compartment in the casing 3 and each terminal 1 is provided with a spring contact 4 on the rear side of the panel connected to the terminal 1 there being 25 terminals and contacts for each bank.

The panel 2 is carried on a spindle 5 passing through the sides of the casing 3 and is mounted on cams 56 on the spindle 5. The spindle 5 may be rotated by a handle 7 to move the panel forwards and backwards in the compartment.

A program card 12 is inserted into the casing 3 through a slot 11 in the top (see FIG. 1) to lie between the back of the casing and the panel 2.

The casing 3 is formed with a cover 13 pivoted on the top of the casing which is closed over the slot 11 when a card 12 has been inserted (FIG. 7) and which cannot be opened until the handle 7 has been rotated into the dotted position shown in FIG. 7.

The cover 13 is locked in the closed position by a spring loaded plunger 16 the upper end of which extends through the casing 3 to engage a notch in the cover. In order to open the cover 13 to expose the slot 11 for changing a card 12 the handle 7 is rotated into the dotted position shown in FIG. 7 which rotates a second cam 14 to allow a ball follower 15 to move under the action of the spring into a recess 17 on the cam thereby retracting the plunger 16 from the notch.

The program card 12 (FIG. 3) forms an integer in the electrical circuit for the uni-selector circuit and consists of a series of rows, T, B11, B12, B13, B14, B15 etc. for contacts corresponding with the rows of contacts on the panel 2. The individual contacts 8 in each row are linked together and are hereinafter termed segments. Each segment 8 represents one interval of the time, and each row represents one channel of control. The card may be in the form of a printed circuit, or a series of linked segments of any conductive material mounted on an insulated backing.

The time control channel T enables a process of any number of steps up to 24 (or the full number of contacts on whatever type of uni-selector is used) to be employed. Where a process requires say 20 steps the contacts 21 to 24 on the time channel T are left intact, and the uni-selector will then home to the end of the card, and to point 0. Thus the control is ready for the next chosen process, or to repeat the existing process, or where 0 is left intact, to cycle the existing process without interruption.

Preparation of the program card 12 is achieved by removing or blanking off any unwanted segments, leaving intact those which are required to process an operation (which need not be a continuous run, but can be brought off and on as required in any row or channel). Each segment 8 will hold a process for a second, half a minute, one minute, one hour or whatever division of time is required the said division of time being governed by the timer unit.

Preparation of the time control channel T consists of removing or blanking off all the segments which cover the control cycle, and leaving intact only those which represent the unused portion of time on the card 12. If a valve or other apparatus connected to bank $B^1$ is required to be in one position for four times the stepping period the first four segments on the row B11 of the card 12 are retained thereon and the remaining segments removed or blanked off. Should a second valve or other apparatus be required to operate during or subsequently to that controlled by B11 the appropriate segments on row B12 are left intact and so on.

The function of the program 12 when in position is to act a multi-point switch, each segment 8 of the card 12 being in contact with its own respective spring contact 4 on panel 2. Thus the rows B11, B12, B13 etc. on the panel 2 are in intimate contact with their respective rows B11, B12, B13 etc. on program card 12.

Control of the sequence of operations need not be tied to the time base. A D.C. supply within the control can be used for external relay circuits etc., and remote switching can be used for the pulsing action of the uni-selector.

The program card 12 is clamped in position in the casing 3 between the back of the casing and the panel 2 by rotation of the handle 7 with the number of the card visible through a window 9 on the back of the casing.

Any number of differing program cards 12 may be employed one at a time for differing programs of the valves or apparatus to be controlled.

Each spring contact is linked directly, and in sequence, with the contact points of the uni-selector. As each bank of the uni-selector governs the operation of one channel of control, any number of channels of control can be offered according to the number of uni-selector banks employed. Also any number of operative control segments may be available according to the type of uni-selector employed.

The time and sequence unit may be employed for controlling sets of contactors, electro-pneumatic valves etc., or for any mechanical or electrical gear which is capable of being initiated and terminated electrically.

What we claim is:

1. A multi-channel time and sequence electrical control apparatus comprising a multi-banked electromagnetically stepped sequentially switching means, one bank of contacts thereof operating as a time control for a sequence of operations which are initiated and controlled by a further bank thereof; a casing within which said switching means is mounted; a panel located in said casing; spring terminals disposed on said panel and electrical conductor means connecting each of said spring terminals to said switching means; a program card located between said panel and said casing and having electrical contacts engaging said spring terminals, said program card providing instructions for the time and sequence operations; a spindle carrying said panel; and eccentric bushings in which said spindle is journalled and which, when rotated, clamp said program card between said panel and said casing.

2. A multi-channel time and sequence electrical control apparatus according to claim 1, including a series of differing program cards any one of which may be clamped to said panel.

3. A multi-channel time and sequence electrical control apparatus according to claim 1, wherein said spring terminals and contacts are arrayed in rows, each row corresponding to one bank of said switching means.

4. A multi-channel time and sequence electrical control apparatus according to claim 1, wherein said casing has a slot through which said program card may be inserted into said casing.

5. A multi-channel time and sequence electrical control apparatus according to claim 1, wherein said program card is of electrically insulating material and said contacts are of electrically conductive material mounted on said card.

6. A multi-channel time and sequence electrical control apparatus according to claim 1, wherein said contacts on said program card are in form of a printed circuit.

References Cited by the Examiner

UNITED STATES PATENTS

| | | | |
|---|---|---|---|
| 1,927,556 | 9/1933 | Nelson. | |
| 2,272,411 | 2/1942 | Johnson | 235—61 |
| 2,822,980 | 2/1958 | Roth | 235—61 |
| 2,830,759 | 4/1958 | Hudes | 235—61 |
| 3,148,251 | 9/1964 | Burke | 200—46 |
| 3,198,897 | 8/1965 | Scofield, et al. | 200—46 |

BERNARD A. GILHEANY, *Primary Examiner.*

H. E. SPRINGBORN, T. MacBLAIN,
*Assistant Examiners.*